US012417872B2

(12) United States Patent
Kornowski et al.

(10) Patent No.: US 12,417,872 B2
(45) Date of Patent: Sep. 16, 2025

(54) BUSHING FOR DISTRIBUTION TRANSFORMER

(71) Applicant: Polycast Industrial Products Ltd., Winnipeg (CA)

(72) Inventors: Marek Kornowski, Winnipeg (CA); Raniero Montanino, Winnipeg (CA); John Dahl, Winnipeg (CA); Sadegh Ghanbar, Winnipeg (CA); Justin Schoonbaert, Winnipeg (CA)

(73) Assignee: Polycast Industrial Products Ltd., Winnipeg (CA)

( * ) Notice: Subject to any disclaimer, the term of this patent is extended or adjusted under 35 U.S.C. 154(b) by 202 days.

(21) Appl. No.: 18/466,978

(22) Filed: Sep. 14, 2023

(65) Prior Publication Data

US 2025/0095900 A1 Mar. 20, 2025

(51) Int. Cl.
*H01F 27/04* (2006.01)

(52) U.S. Cl.
CPC .................................... *H01F 27/04* (2013.01)

(58) Field of Classification Search
CPC ........ H01F 27/02; H01F 27/025; H01F 27/04; H01F 27/06; H01F 27/085; H01F 27/12; H01F 27/14; H01F 27/40; H01B 17/42; H01B 17/44; H01B 17/46; H01B 17/48; H01B 17/301; H01B 17/308; H01B 17/34; H01B 17/36; H01H 33/555; H01H 9/0044; H01R 13/53
See application file for complete search history.

(56) References Cited

U.S. PATENT DOCUMENTS 3,663,928 A * 5/1972 Keto ...................... H01R 13/53 174/152 R
3,936,592 A * 2/1976 Gamble .................. H01F 27/04 174/153 R

* cited by examiner

*Primary Examiner* — Roshn K Varghese
(74) *Attorney, Agent, or Firm* — Adrian D. Battison; Ade & Company Inc.; Ryan W. Dupuis

(57) ABSTRACT

An electrical bushing for a transformer housing includes an elongate conductor with a metal annular disk for welded attachment to an edge of an aperture in the housing with an insulating bushing between the conductor and the disk. The insulating bushing includes first and second tubular bushing portions each formed of a cast epoxy resin and each surrounding a portion of the elongate conductor. the first bushing portion is cast on the elongate conductor with an integral bond therewith. The second bushing portion can slide along the exterior surface of the elongate conductor and is threaded onto a male portion of the first bushing portion. The first and second bushing portions have annular abutment surfaces clamping the annular disk therebetween and typically three sealing O-rings are provided at the junction to prevent passage of the transformer liquid from the interior.

9 Claims, 2 Drawing Sheets

FIG. 3
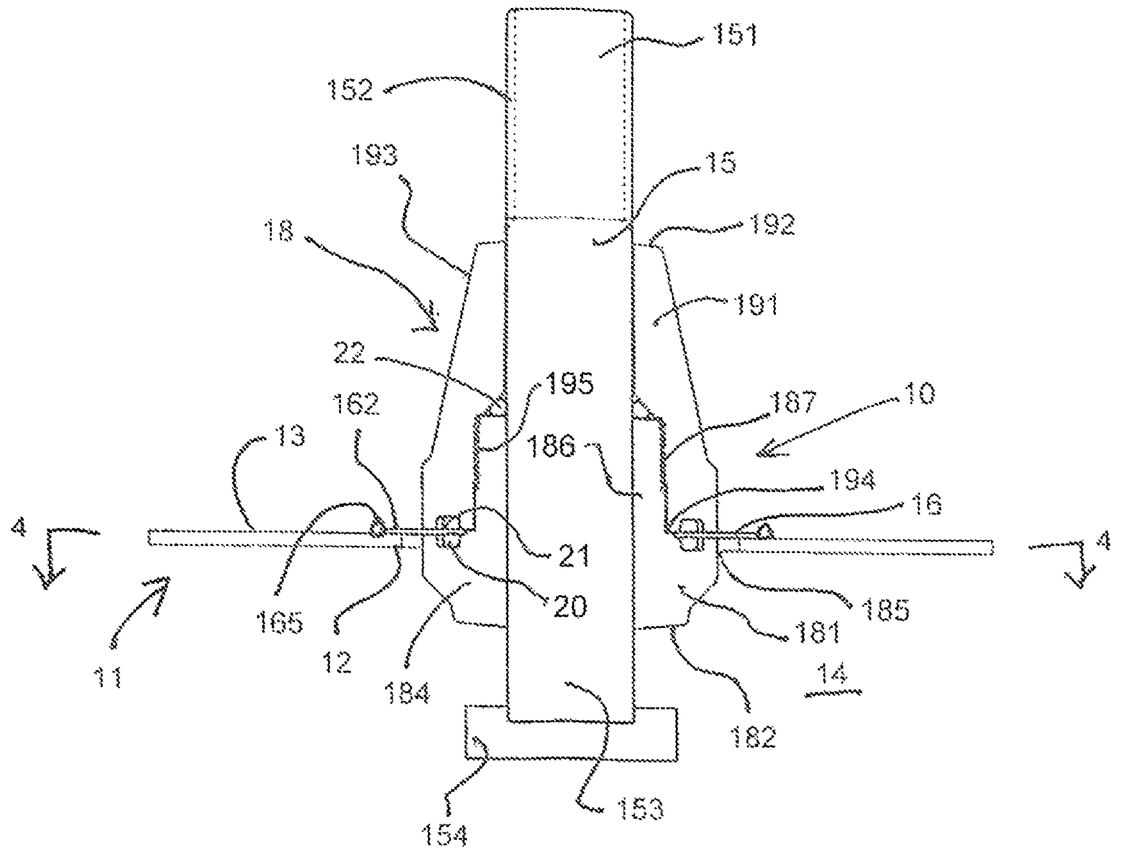
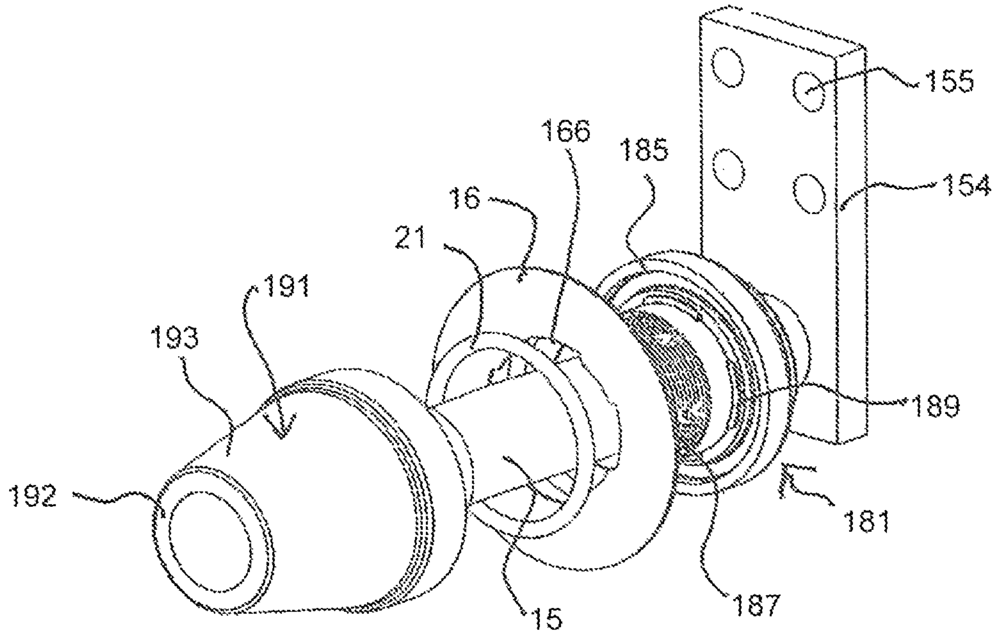
FIG. 2

BUSHING FOR DISTRIBUTION TRANSFORMER

This invention relates to a bushing assembly for a distribution transformer.

BACKGROUND OF THE INVENTION

It is well known that distribution transformers require a series of electrical connector bushings which allow communication of current through the exterior housing to the exterior connections.

Each thus includes an elongate conductor shaped and arranged to pass through an aperture in the housing and providing at an exterior end a portion for connection to an exterior electrical connector outside the housing wall within ambient air and at an interior end portion for connection to an interior electrical connector inside the housing wall within an insulating transformer liquid. The style of the interior and exterior electrical connectors can vary depending on the design of the transformer so that the elongate conductor may include various styles of end coupling to accommodate this.

The dimensions of the conductor can vary depending again on the design of the transformer concerned and including the current flow and voltages that must be accommodated.

The conductor is typically copper but may include other materials such as aluminum. In many cases the exterior surfaces of the conductor are coated to reduce corrosion.

The interior of the housing contains an insulating fluid which cannot be allowed to escape through or around the bushing.

The bushing must include an electrical insulator which prevents any communication of current from the conductor to the housing. The dimensions and shape of the insulator can also vary again depending on the design of the transformer including the voltages involved.

In one arrangement the electrical bushing for a transformer housing thus includes an elongate conductor with a metal annular disk for welded attachment to an edge of an aperture in the housing with an insulating bushing between the conductor and the disk.

The welded attachment of the annular disk component to the housing is well accepted and standard connection method. However the attachment of the disk to the insulating material has been problematic. This attachment must prevent escape of the transformer liquid and must be mechanically sound.

The insulating material can be a ceramic but more preferably at this time use of cast epoxy has become a better option. It is known how to cast an epoxy material onto a conductor in a manner which ensures sound mechanical connection and also ensures an effective seal which prevents the liquid from passing along the annular connection between the outer surface of the conductor and the inner tubular surface of the cast epoxy.

As set forth above, the standard bushing requires an annular metal disk attached to the insulating material. Again this can be attached by casting the disk as an integral component with the epoxy casting material.

SUMMARY OF THE INVENTION

It is an object of the present invention to provide an improved bushing of the above type According to the invention there is provided an electrical bushing for extending through an aperture in a housing wall of a transformer, the bushing comprising

- an elongate conductor shaped and arranged to pass through the aperture and providing at an exterior end a portion for connection to an exterior electrical connector outside the housing wall within ambient air and at an interior end portion for connection to an interior electrical connector inside the housing wall within an insulating transformer liquid;
- a metal annular disk lying in a radial plane of and surrounding the elongate conductor, the metal disk having an exposed outer rim portion arranged for welded attachment to an edge of the aperture in the housing;
- and first and second tubular bushing portions each formed of a cast epoxy resin and each surrounding a portion of the elongate conductor;
- the first bushing portion being located adjacent the interior end of the elongate conductor so as to be located in the insulating transformer liquid and leaving the interior end portion exposed;
- the first bushing portion being cast on the elongate conductor so that an interior surface thereof forms an integral bond with an exterior surface of the elongate conductor;
- the second bushing portion being located adjacent the exterior end of the elongate conductor so as to be located in the ambient air and leaving the exterior end portion exposed;
- the second bushing portion being loosely located on the elongate conductor so that an interior surface thereof can slide along the exterior surface of the elongate conductor;
- a threaded connection between the first and second bushing portions connecting the first and second bushing portions together;
- the first and second bushing portions having abutment surfaces with the annular disk clamped between the abutment surfaces of the first and second bushing portions;
- and at least one sealing O-ring preventing passage of the transformer liquid from the interior of the housing past the abutment surfaces to the exterior.

In this arrangement preferably the annular disk is a free separate component from both the bushing portions allowing the bushing portions to be cast without concern for the integration with the disk In order to ensure the sealing action between the first bushing portion and the disk, preferably the sealing O-ring is located between the annular disk and the first bushing portion.

This can be supplemented by a second sealing O-ring located between the annular disk and the second bushing portion.

This can be further supplemented by a third sealing O-ring located between the first and second bushing portions at the threaded connection therebetween.

Preferably the first bushing portion includes a male portion thereon extending into a female portion of the second bushing portion with the threaded connection therebetween. In this arrangement the third sealing O-ring can be located between the first and second bushing portions at an end of the male portion.

In this arrangement preferably the annular disk surrounds the male portion. The annular disk may include cooperating engagement portions relative to the male portion to prevent rotation of the male portion relative the annular disk when torque is applied to the second bushing portion to engage the threaded coupling.

BRIEF DESCRIPTION OF THE DRAWINGS

One embodiment of the invention will now be described in conjunction with the accompanying drawings in which:

FIG. 2 is a second isometric exploded view of the electrical bushing of FIG. 1.

FIG. 3 is a cross-sectional view of the electrical bushing of FIG. 1 taken along the lines 3-3.

In the drawings like characters of reference indicate corresponding parts in the different figures.

DETAILED DESCRIPTION

Figure 1:
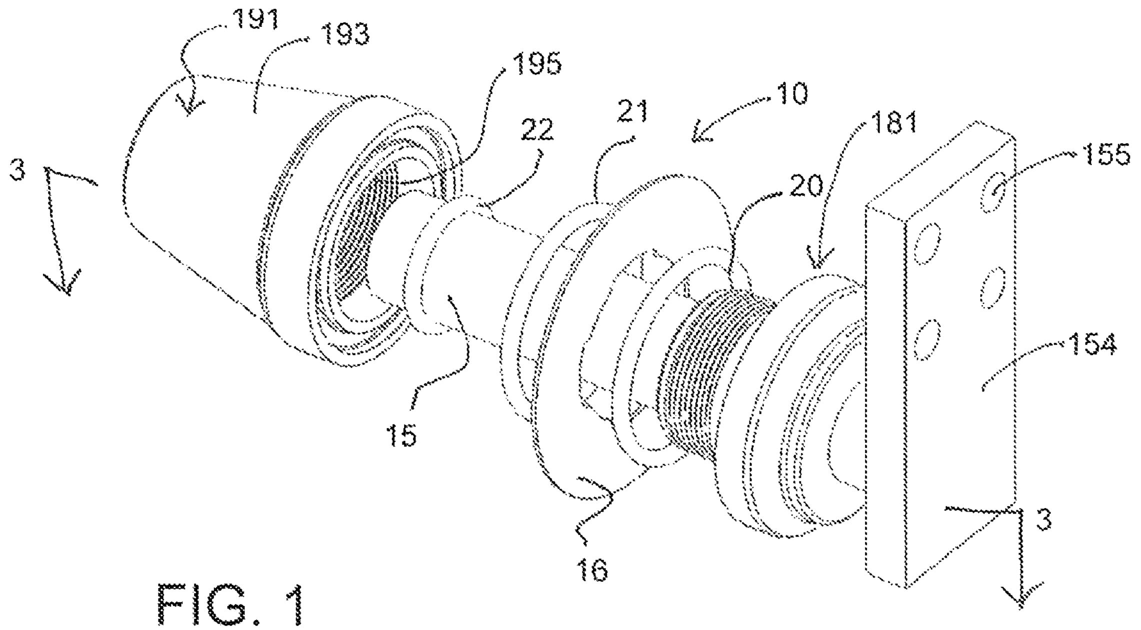
FIG. 1 is an isometric exploded view of an electrical bushing according to the present invention for mounting in a housing of a transformer.
Figure 4:
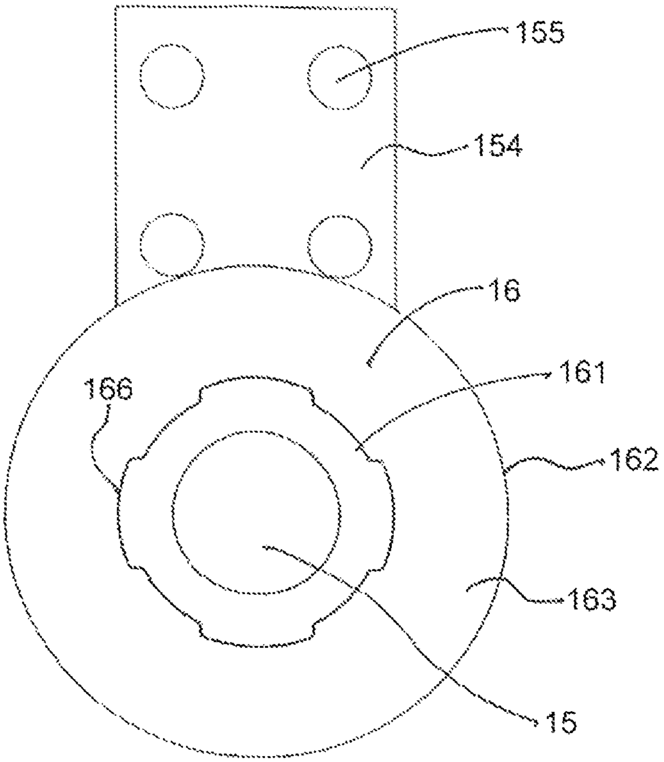
FIG. 4 is a cross-sectional view of the electrical bushing of FIG. 1 taken along the lines 4-4 of FIG. 3.

The arrangement herein provides an electrical bushing 10 for mounting in a housing 11 of a transformer where the busing extends through an aperture 12 in a housing wall 13 of a transformer.

The bushing 10 is shaped and arranged to pass through the aperture 12 for connection to an exterior electrical connector outside the housing wall 13 within ambient air and for connection to an interior electrical connector inside the housing wall 13 within an insulating transformer liquid 14.

The bushing 10 includes an elongate conductor 15 typically of copper which is typically cylindrical but can be of any cross-sectional shape as required by design. The conductor 15 includes at an exterior end 151 a portion 152 for connection to an exterior electrical connector (not shown) outside the housing wall 13 within ambient air and at an interior end 153 a portion 154 for connection to an interior electrical connector (not shown) inside the housing wall within the insulating transformer liquid 14. In the embodiment shown the connector portion 152 comprises a threaded portion of the conductor but this can be modified depending on requirements. In the embodiment shown the connector portion 154 comprises a flat plate at right angles to the conductor with fastening holes 155 on one side of the conductor but this can be modified depending on requirements.

The bushing further requires a metal annular disk 16 lying in a radial plane of and surrounding the elongate conductor 15. The metal disk is flat and has an inner edge 161 surrounding the conductor 15 and an outer rim portion 163 at an outer edge 162 arranged for welded attachment by a circular weld line 165 to the edge of the aperture 12 in the housing. The disk is thus dimensioned so that it is slightly larger in diameter than the aperture allowing an overlap therebetween to which the weld line 65 can be applied to create a mechanical connection and a suitable seal therebetween using standard and well-known welding practices.

The bushing further includes an insulating material which electrically separates the conductor from the disk and therefore from the housing. This must provide sufficient distance of the connectors from the housing and of the conductor from the disk to ensure no current can flow from one to the other. The design, dimensions and shape of the insulating material can therefore change depending on design requirements and are typically established by the manufacturer of the transformer.

The inner portion of the disk 16 at the inner edge 161 must be sealed relative to the insulating material to ensure that none of the liquid 14 can flow though any passage from the interior of the housing to the exterior. As previously stated, the connection between the exterior surface of the conductor 15 and the insulating material can be formed by casting the insulating material in place and this is well established. However the arrangement herein provides a sealing effect between the inner part of the disk and insulting material in a novel manner which provides both the mechanical connection required and also prevents passage of liquid past the disk to the exterior.

For this purpose the insulating material or bushing material 18 is formed as first and second tubular bushing portions 181 and 191 each formed of a cast epoxy resin and each surrounding a portion of the elongate conductor 15.

The first bushing portion 181 is located adjacent the interior end 153 of the elongate conductor 15 so as to be located within the insulating transformer liquid 14 and leaving the interior end portion 153 exposed to receive the required connector. The first bushing portion 181 is cast on the elongate conductor so that an interior surface thereof forms an integral bond with an exterior surface of the elongate conductor.

The first bushing portion 181 has an end face 182 spaced from the end 153 and extends from the end face into an annular portion 184 forming a front face 185. The portion 181 further includes an annular male portion 186 thereon extending longitudinally along the conductor toward the end 151. The annular male portion 186 has an external thread 187 located at a diameter less than that of the annular portion 184. The whole length of the portion 181 along the conductor including the annular portion and the male portion is sealed to the conductor by the casting process.

The second bushing portion 191 is located adjacent the exterior end 151 of the elongate conductor 15 leaving the exterior end portion exposed. The portion 191 is located in the ambient air and thus does not require sealing action as the movement of the ambient air is acceptable.

The second bushing portion is thus loosely located on the elongate conductor so that an interior surface 192 thereof can slide along the exterior surface of the elongate conductor 15.

The second portion 191 has an end face 192 adjacent the end portion 151 and forms a conical outer surface 193 extending therefrom along the portion toward the disk 16. At the disk 16 the portion has a front face 194 butting the disk 16. The portion 191 also includes a female receptacle 195 which is threaded to form a threaded connection between the first and second bushing portions connecting the first and second bushing portions together.

The second portion 191 can thus be applied onto the conductor 15 and can be rotated and moved axially to connect the threads of the surfaces 187 and 195 to clamp the two portions together.

The first and second bushing portions thus define abutment surfaces 185 and 194 of the first and second bushing portions with the annular disk clamped between the abutment surfaces.

Thus with the two portions clamped together the disk is clamped in place and is mechanically held in place in the insulating material so as to allow connection of the bushing to the housing at the aperture.

In order to prevent passage of the liquid past the disk to escape to the exterior at least one sealing O-ring is provided preventing passage of the transformer liquid from the interior of the housing past the abutment surfaces 187 and 195 to the exterior.

The sealing O-rings include a first sealing O-ring 20 located between the annular disk 16 and the first bushing portion 181 at a recess in the surface 185.

The sealing O-rings include a second sealing O-ring 21 located between the annular disk 16 and the second bushing portion 191 at a recess in the surface 194.

The sealing O-rings include a third sealing O-ring 22 located between the first and second bushing portions 181 and 191 at the end of the male portion 186 so as to cooperate with an end wall of the female receptacle 195.

The annular disk 16 surrounds the male portion 186 but is a loose fit thereon. The annular disk 16 includes cooperating engagement portions relative to the male portion to prevent rotation of the male portion relative the annular disk when torque is applied to the second bushing portion to engage the threaded coupling. This is provided by recesses 166 in the inner edge 161 of the disk which engage matching projections 189 on the male portion 186. Thus when the disk sits against the abutment wall 185 at the O-ring recess, the recesses engage over the projections to hold the components against relative rotation. This avoids the application of torque on the second portion 191 to allow rotation of the conductor 15 and the internal fittings inside the transformer since both are locked to the housing by the welded disk.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. An electrical bushing for extending through an aperture in a housing wall of a transformer, the bushing comprising an elongate conductor shaped and arranged to pass through the aperture and providing at an exterior end a portion for connection to an exterior electrical connector outside the housing wall within ambient air and at an interior end portion for connection to an interior electrical connector inside the housing wall within an insulating transformer liquid; a metal annular disk lying in a radial plane of and surrounding the elongate conductor, the annular disk having an exposed outer rim portion arranged for welded attachment to an edge of the aperture in the housing; and first and second tubular bushing portions each formed of a cast epoxy resin and each surrounding a portion of the elongate conductor; the first bushing portion being located adjacent the interior end of the elongate conductor so as to be located in the insulating transformer liquid and leaving the interior end portion exposed; the first bushing portion being cast on the elongate conductor so that an interior surface thereof forms an integral bond with an exterior surface of the elongate conductor; the second bushing portion being located adjacent the exterior end of the elongate conductor so as to be located in the ambient air and leaving the exterior end portion exposed; the second bushing portion being loosely located on the elongate conductor so that an interior surface thereof can slide along the exterior surface of the elongate conductor; a threaded connection between the first and second bushing portions connecting the first and second bushing portions together; the first and second bushing portions having abutment surfaces with the annular disk clamped between the abutment surfaces of the first and second bushing portions; and at least one sealing O-ring preventing passage of the transformer liquid from the interior of the housing past the abutment surfaces to the exterior.

2. The electrical bushing according to claim 1 wherein the annular disk is free.

3. The electrical bushing according to claim 1 wherein the at least one sealing O-ring includes a first sealing O-ring located between the annular disk and the first bushing portion.

4. The electrical bushing according to claim 1 wherein the at least one sealing O-ring includes a second sealing O-ring located between the annular disk and the second bushing portion.

5. The electrical bushing according to claim 1 wherein the at least one sealing O-ring includes a third sealing O-ring located between the first and second bushing portions.

6. The electrical bushing according to claim 1 wherein the first bushing portion includes a male portion thereon extending into a female portion of the second bushing portion with the threaded connection therebetween.

7. The electrical bushing according to claim 6 wherein the at least one sealing O-ring includes a third sealing O-ring located between the first and second bushing portions at an end of the male portion.

8. The electrical bushing according to claim 6 wherein the annular disk surrounds the male portion.

9. The electrical bushing according to claim 6 wherein the annular disk includes cooperating engagement portions relative to the male portion to prevent rotation of the male portion relative the annular disk when torque is applied to the second bushing portion to engage the threaded coupling.

* * * * *